United States Patent
Tremblay et al.

(10) Patent No.: US 9,767,093 B2
(45) Date of Patent: Sep. 19, 2017

(54) SYNTACTIC PARSER ASSISTED SEMANTIC RULE INFERENCE

(71) Applicant: Nuance Communications, Inc., Burlington, MA (US)

(72) Inventors: Real Tremblay, Outremont (CA); Gabriel Forgues, Greenfield Park (CA); Tagyoung Chung, Sunnyvale, CA (US)

(73) Assignee: Nuance Communications, Inc., Burlington, MA (US)

( * ) Notice: Subject to any disclaimer, the term of this patent is extended or adjusted under 35 U.S.C. 154(b) by 43 days.

(21) Appl. No.: 14/308,918

(22) Filed: Jun. 19, 2014

(65) Prior Publication Data
US 2015/0370778 A1    Dec. 24, 2015

(51) Int. Cl.
*G06F 17/27*    (2006.01)
*G06F 17/20*    (2006.01)
*G06F 17/28*    (2006.01)

(52) U.S. Cl.
CPC ...... *G06F 17/2785* (2013.01); *G06F 17/2705* (2013.01); *G06F 17/2725* (2013.01); *G06F 17/2881* (2013.01)

(58) Field of Classification Search
None
See application file for complete search history.

(56) References Cited

U.S. PATENT DOCUMENTS

| 5,878,385 | A | * | 3/1999 | Bralich | G06F 17/2705 |
| | | | | | 704/10 |
| 6,615,178 | B1 | | 9/2003 | Tajima | |
| 7,257,565 | B2 | * | 8/2007 | Brill | G06F 17/27 |
| | | | | | 706/12 |
| 7,548,847 | B2 | | 6/2009 | Acero et al. | |

(Continued)

FOREIGN PATENT DOCUMENTS

WO    WO 2015/195744 A1    12/2015

OTHER PUBLICATIONS

Notification of Transmittal of the International Search Report and the Written Opinion of the International Searching Authority for Int'l Application No. PCT/US2015/036143, "Syntactic Parser Assisted Semantic Rule Inference by Generation of Alternate Parse Trees," Date Mailed: Nov. 26, 2015.

(Continued)

*Primary Examiner* — Marcus T Riley
(74) *Attorney, Agent, or Firm* — Hamilton, Brook, Smith & Reynolds, P.C.

(57) ABSTRACT

Natural language understanding (NLU) engines perform better when they are trained with large amounts of data. However, a large amount of data is not always available. Embodiments of the present invention overcome this problem by generating annotated data for use in a NLU system. An example embodiment generates annotated data by parsing an input annotated phrase, generating a syntactic tree reflecting a grammatical structure of the parsed phrase, and generating one or more alternative versions of the input (Continued)

annotated phrase based on the syntactic tree. Alignment between expressions and corresponding annotations in the annotated phrase are preserved in the one or more alternative versions generated to ensure intention of the input annotated phrase is maintained.

20 Claims, 13 Drawing Sheets

(56) References Cited

U.S. PATENT DOCUMENTS

| | | | |
|---|---|---|---|
| 7,617,093 | B2 | 11/2009 | Ramsey |
| 7,653,545 | B1 | 1/2010 | Starkie |
| 7,869,998 | B1 | 1/2011 | Di Fabbrizio et al. |
| 2002/0111811 | A1 | 8/2002 | Bares et al. |
| 2002/0156616 | A1 | 10/2002 | Russell |
| 2003/0121026 | A1 | 6/2003 | Wang et al. |
| 2004/0083092 | A1 | 4/2004 | Valles |
| 2004/0122653 | A1 | 6/2004 | Mau et al. |
| 2004/0220797 | A1* | 11/2004 | Wang ............... G06F 17/2705 704/9 |
| 2004/0220809 | A1 | 11/2004 | Wang et al. |
| 2005/0246158 | A1* | 11/2005 | Weise ............... G06F 17/274 704/4 |
| 2006/0074634 | A1 | 4/2006 | Gao et al. |
| 2008/0059149 | A1 | 3/2008 | Martin |
| 2008/0126078 | A1 | 5/2008 | Starkie |
| 2008/0133220 | A1 | 6/2008 | Paek et al. |
| 2008/0208584 | A1 | 8/2008 | Ativanichayaphong et al. |
| 2009/0076799 | A1 | 3/2009 | Crouch et al. |
| 2009/0259459 | A1* | 10/2009 | Ceusters ............ G06F 17/2775 704/9 |
| 2009/0276396 | A1 | 11/2009 | Gorman et al. |
| 2009/0292530 | A1 | 11/2009 | Jarmulak et al. |
| 2010/0145902 | A1 | 6/2010 | Boyan et al. |
| 2010/0332217 | A1* | 12/2010 | Wintner ............. G06F 17/2785 704/9 |
| 2011/0054899 | A1 | 3/2011 | Phillips et al. |
| 2012/0109637 | A1 | 5/2012 | Merugu et al. |
| 2013/0173247 | A1* | 7/2013 | Hodson ............... G06F 17/2827 704/4 |
| 2014/0297282 | A1* | 10/2014 | Peters ................ G10L 15/19 704/254 |
| 2014/0337814 | A1 | 11/2014 | Kalns et al. |
| 2015/0019202 | A1 | 1/2015 | Tremblay et al. |
| 2016/0026608 | A1 | 1/2016 | Curin et al. |

OTHER PUBLICATIONS

Gonçalves, Patrícia Nunes, et al., "Treebanking by Sentence and Tree Transformation: Building a Treebank to Support Question Answering in Portuguese," LREC 2012, Turkey, May 23, 2012, pp. 1895-1901.

Burkett, David et al., "Transforming Trees to Improve Syntactic Convergence," Proceedings of the 2012 Joint Conference on Empirical Methods in Natural Language Processing and Computational Natural Language Learning, Jul. 12, 2012, pp. 863-872, Retrieved from the Internet URL: http://www.cecs.berkeley.edu/~dburkett/papers/burkett12/tree_transform.pdf [retrieved on Nov. 19, 2015].

Torisawa, Kentaro, "A Nearly Unsupervised Learning Method for Automatic Paraphrasing of Japanese Noun Phrases," In Proceedings of the Sixth Natural Language Processing Pacific Rim 2001, Jan. 1, 2001.

Bengoetxea, Kepa, et al., "Exploring Treebank Transformation in Dependency Parsing," International Conference Ranlp 2009, Jan. 1, 2009, pp. 33-38, Borovets, Bulgaria.

Cheongjae Lee, Sangkeun Jung, Seokhwan Kim, Gary Geunbae Lee, "Example-based dialog modeling for practical multi-domain dialog system," copyright 2009, published by ScienceDirect, Speech Communication 51 (2009), pp. 466-484.

Kluwer, T., et al., "Using Syntactic and Semantic based Relations for Dialogue Act Recognition", Coling, 2010: Poster Volume, pp. 570-578, Beijing, Aug. 2010.

International Preliminary Report on Patentability for Int'l Application No. PCT/US2015/036143, "Syntactic Parser Assisted Semantic Rule Inference by Generation of Alternate Parse Trees," Dated: Dec. 20, 2016.

* cited by examiner

```
                                                            ← 555
<rule id="root" scope="public">
<one-of>
   <item>
   I would like to go from
            <item>
                <ruleref uri="#LOCATION"/>
            </item>
            <tag>DEPARTURE_LOCATION = LOCATION.location</tag>
   to
        <item>
                <ruleref uri="#LOCATION"/>
            </item>
             <tag>ARRIVAL_LOCATION = LOCATION.location</tag>
         </item>
         <item>
             <ruleref uri="#DATE"/>
               <tag>WHEN = DATE.date</tag>
         </item>
   </item>
   [...]
</one-of>

<rule id="LOCATION" scope="private">
     <one-of>
         <item>
         <ruleref uri="#CITY"/>
         <tag> location = CITY.city </tag>
         </item>
          <item>
         <ruleref uri="#STATE"/>
         <tag> location = STATE.state </tag>
         </item>
     </one-of>
  </rule>
```

FIG. 5

775—I want [the earliest flight] [on Fri~~day~~]—776

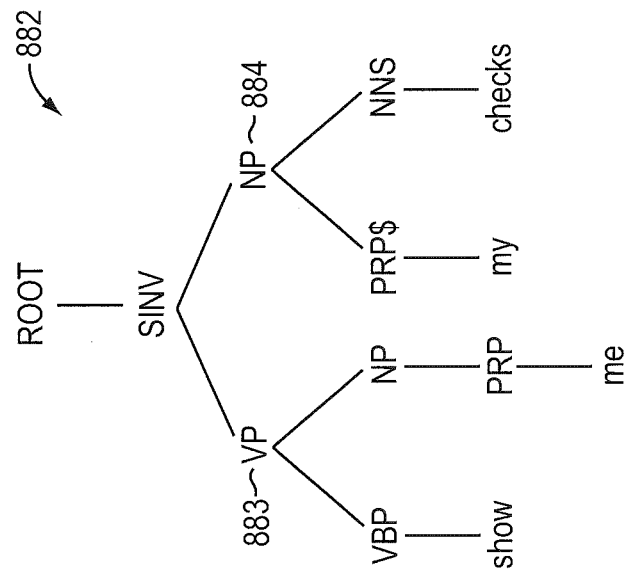
FIG. 8B
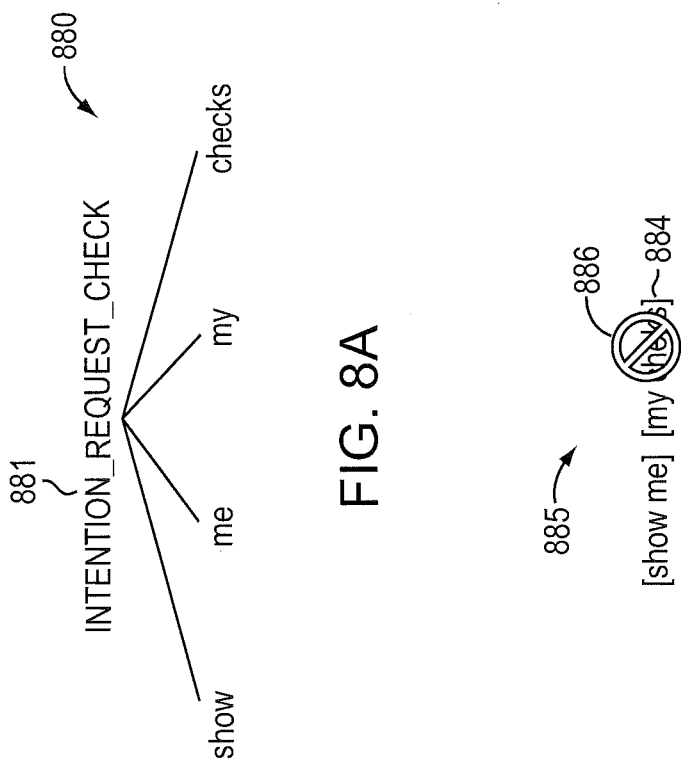
FIG. 8A
FIG. 8C

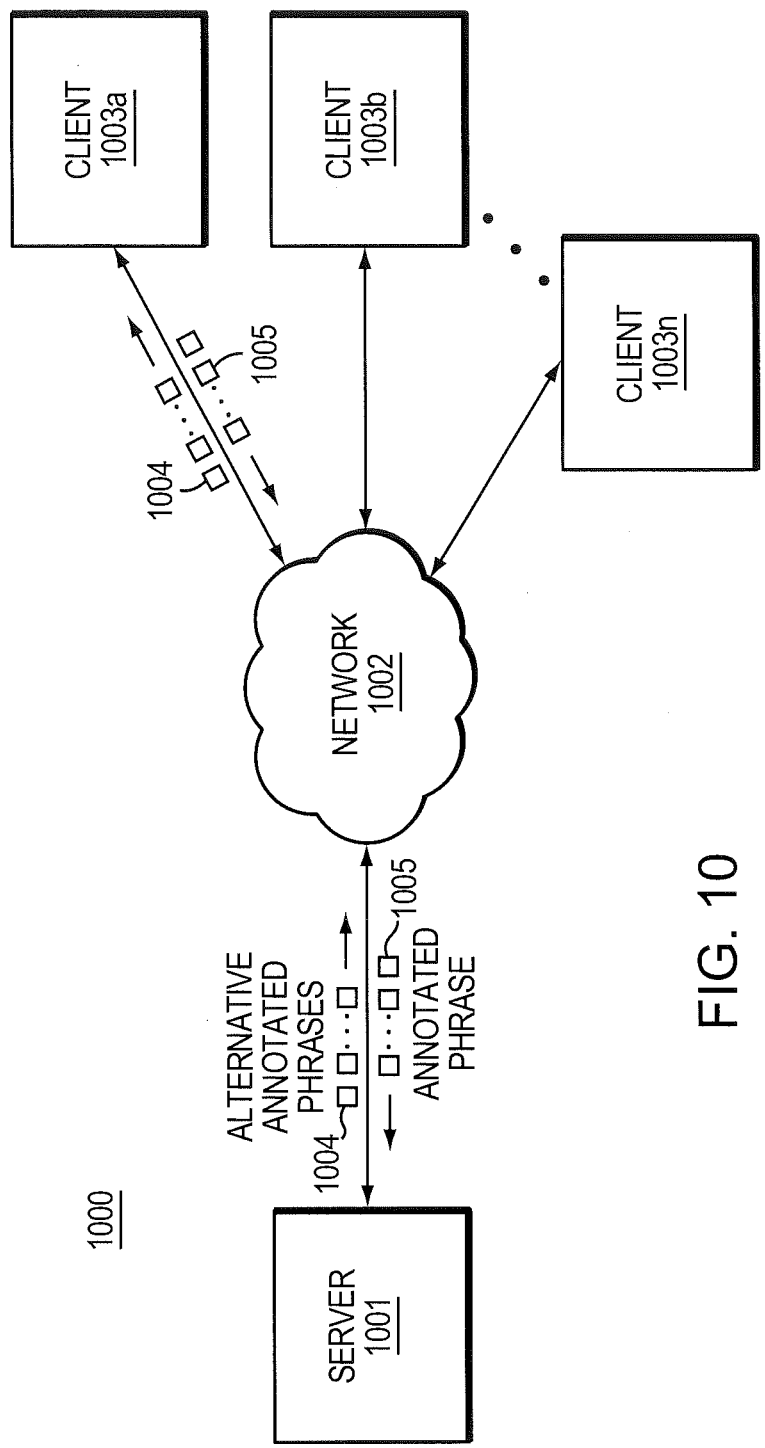

SYNTACTIC PARSER ASSISTED SEMANTIC RULE INFERENCE

BACKGROUND OF THE INVENTION

Achieved advances in speech processing and media technology have led to a wide use of automated user machine interaction across different applications and services. Using an automated user machine interaction approach, businesses may provide customer services and other services with relatively inexpensive cost.

SUMMARY OF THE INVENTION

Embodiments of the present invention generate annotated data for use in a natural language understanding (NLU) system. An example embodiment generates the annotated data by generalizing the semantic rules learned from an annotated sample by employing a syntactic parser.

According to at least one example embodiment, a method of the present invention generates annotated data for use in a NLU system by first parsing, by a computer device, an input annotated phrase. Next, a syntactic tree reflecting a grammatical structure of the parsed phrase is generated. The method according to such an embodiment concludes by generating one or more alternative versions of the input annotated phrase based on the generated syntactic tree in a manner preserving alignment between expressions and corresponding annotations in the input annotated phrase in the one or more alternative versions that are generated.

An alternative embodiment of the present invention further comprises validating the one or more alternative versions of the input annotated phrase. According to such an embodiment, validating the one or more alternative versions of the input annotated phrase comprises checking an alternative version, of the one or more versions, against a database of non-annotated phrases and validating the alternative version upon finding a match in the database of non-annotated phrases. According to yet another embodiment of the present invention, validating the one or more alternative versions of the input annotated phrase includes displaying the one or more versions of the input annotated phrase to a user for manual validation.

According to an embodiment of the present invention, generating the one or more alternative versions of the input annotated phrase includes applying one or more transformation rules to nodes of the generated syntactic tree. In such an embodiment of the present invention, applying one or more transformation rules to the nodes of the syntactic tree includes reordering expressions of the input annotated phrase within an alternative version of the one or more versions generated, the expressions associated with nodes of the generated syntactic tree. In yet another embodiment, applying one or more transformation rules to nodes of the syntactic tree includes omitting an expression of the input annotated phrase within an alternative version of the one or more versions generated, wherein the expression is again associated with one or more nodes of the generated syntactic tree. According to an embodiment that includes omitting an expression of the input annotated phrase within an alternative version of the one or more phrases generated, the one or more transformation rules may include a rule associated with a language structure. Yet further still, according to at least one example embodiment, applying the one or more transformation rules to nodes of the syntactic tree includes inserting an expression within a version of the one or more versions generated. According to an embodiment, the one or more transformation rules includes a transformation rule learned based on a database of annotated phrases. In yet another embodiment, the one or more transformation rules includes a rule associated with a language structure.

A further embodiment of the present invention is directed to an apparatus for generating annotated data for use in a NLU system. In such an embodiment the apparatus comprises a processor and a memory with computer code instructions stored thereon. The processor and the memory with the computer code instructions are configured to cause the apparatus to: parse an input annotated phrase, generate a syntactic tree reflecting a grammatical structure of the parsed phrase, and generate one or more alternative versions of the input annotated phrase based on the generated syntactic tree in a manner preserving alignment between expressions and corresponding annotations in the input annotated phrase in the one or more alternative versions that are generated.

In a further embodiment of the apparatus, the processor and the memory with the computer code instructions are further configured to cause the apparatus to validate the one or more alternative versions of the input annotated phrase. In such an embodiment, validating the one or more alternative versions of the input annotated phrase may comprise the processor and the memory with the computer code instructions being further configured to cause the apparatus to check an alternative version of the one or more versions against a database of non-annotated phrases and validate the alternative version upon finding a match in the database of non-annotated phrases. In yet another embodiment, the apparatus comprises computer code instructions that are further configured to cause the apparatus to validate the one or more alternative versions of the input annotated phrase by displaying the one or more versions of the input annotated phrase to a user for manual validation.

According to an embodiment of the apparatus, generating one or more alternative versions of the input annotated phrase, the processor and the memory with computer code instructions are further configured to cause the apparatus to apply one or more transformation rules to nodes of the syntactic tree. In such an embodiment, applying rules to nodes of the syntactic tree may comprise reordering expressions of the input annotated phrase within an alternative version of the one or more generated versions, wherein the expression is associated with nodes of the syntactic tree. Yet further still, in an apparatus configured to apply one or more transformation rules to nodes of the syntactic tree, the apparatus may be configured to omit an expression of the input annotated phrase within an alternative version of the one or more versions that are generated, wherein the expression is associated with nodes of the generated syntactic tree. According to at least one embodiment, in applying one or more transformation rules to nodes of the syntactic tree, the processor and the memory with the computer code instructions cause the apparatus to insert an expression within a version of the one or more generated versions.

Yet another embodiment of the present invention is directed to a cloud computing implementation for generating annotated data for use in a NLU system. Such an embodiment is directed to a computer program product executed by a server in communication across a network with one or more clients. In such an embodiment, the computer program product comprises a computer readable medium that comprises program instructions which, when executed by a processor causes: parsing an input annotated phrase, generating a syntactic tree reflecting a grammatical structure of the parsed phrase, and generating one or more alternative versions of the input annotated phrase based on the generated syntactic tree in a manner preserving alignment between expressions and corresponding annotations in the input annotated phrase in the one or more alternative versions that are generated.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5 illustrates example grammar rules generated from the annotation tree of FIG. 4.

FIG. 8A is a visual depiction of an annotation tree.

FIG. 8B is a syntactic parse tree generated using the annotated dialog of FIG. 8A.

FIG. 8C is a proposed alternative sentence based upon the annotation tree in FIG. 8A and the syntactic parse tree of FIG. 8B.

FIG. 10 is a simplified diagram of a computer network environment in which an embodiment of the present invention may be implemented.

DETAILED DESCRIPTION OF THE INVENTION

A description of example embodiments of the invention follows.

Natural language understanding (NLU) engines perform better when they are trained with a very large amount of data. However, large amounts of training data is not always available. Embodiments of the present invention overcome the shortcomings of prior art methods and increase a NLU engine's performance when little training data is available. Embodiments of the present invention generalize the semantic rules learned from an annotated sample by employing a syntactic parser. This enables the NLU engine to learn more from each training sentence, and the NLU engine's performance increases even when little training data is available. One or more embodiments of the present invention combine the simplicity of semantic annotations with the power of a syntactic parser, thus using both a syntactic and semantic approach to increase NLU engine performance.

Figure 1A:
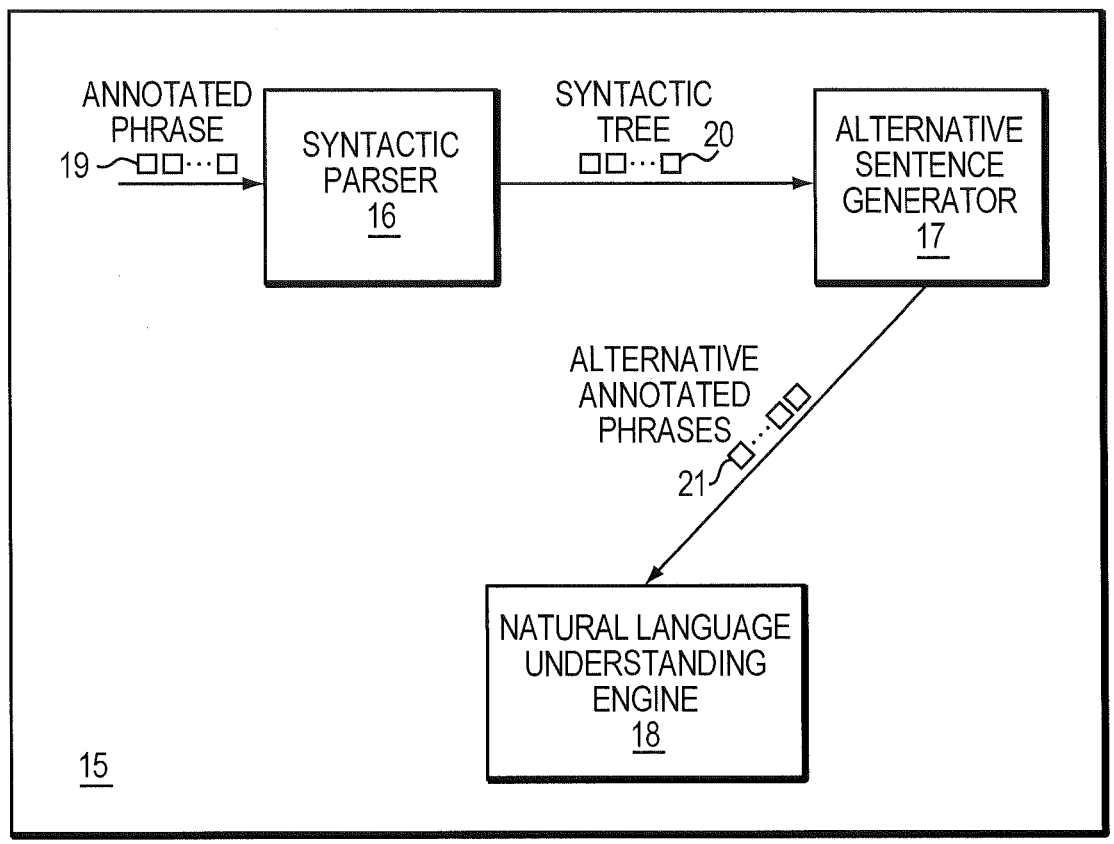
FIG. 1A is a simplified block diagram of a system implementing an example embodiment of the present invention.

FIG. 1A is a simplified block diagram illustrating a system 15 implementing an example embodiment of the present invention. The system 15 comprises a syntactic parser 16, an alternative sentence generator 17, and a NLU engine 18. The various components of the system 15 are communicatively coupled and function to generate alternative annotated phrases 21 for use by the NLU engine 18. The syntactic parser 16 receives a sentence and the sentence's semantic annotation 19. The syntactic parser 16 decomposes the sentence 19 into its syntactic parts, i.e., verb phrases; noun phrases, prepositional phrases, etc., and generates a syntactic tree 20 using the same. Next, after receiving the syntactic tree 20, the alternative sentence generator 17 performs transformations to the syntactic tree 20, e.g., swaps or removals of some syntactic subtrees, in order to generate multiple alternative formulations of the original sentence. The alternative sentence generator 17 may also receive the annotated phrase 19 and use the same in generating the alternative sentences. For each of these alternative sentences, the same syntax transformations are repeated onto the original sentence's semantic annotation by the alternative sentence generator 17 in order to infer the alternative sentence's annotation. In this way a single annotated sentence is used to generate multiple alternative sentences 21, each of them with their appropriate semantic annotations. The alternative annotated phrases 21 are then provided to the NLU engine 18, to be used for such things as training the NLU engine 18. The terms modify, transform, transduce, and any forms thereof may be used interchangeably herein.

Figure 1B:
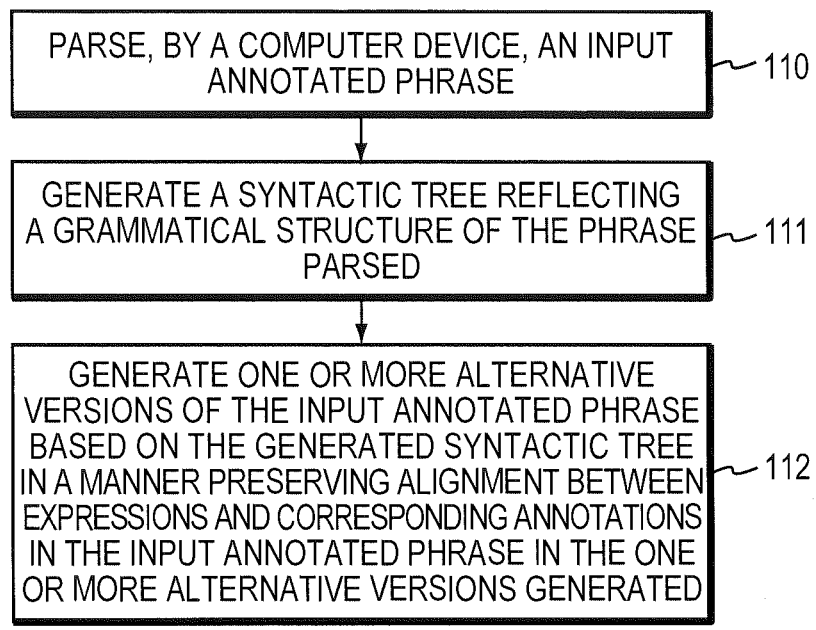
FIG. 1B is a flowchart depicting a method of generating annotated data for use in a natural language understanding (NLU) system according to an embodiment of the present invention.
Figure 4:
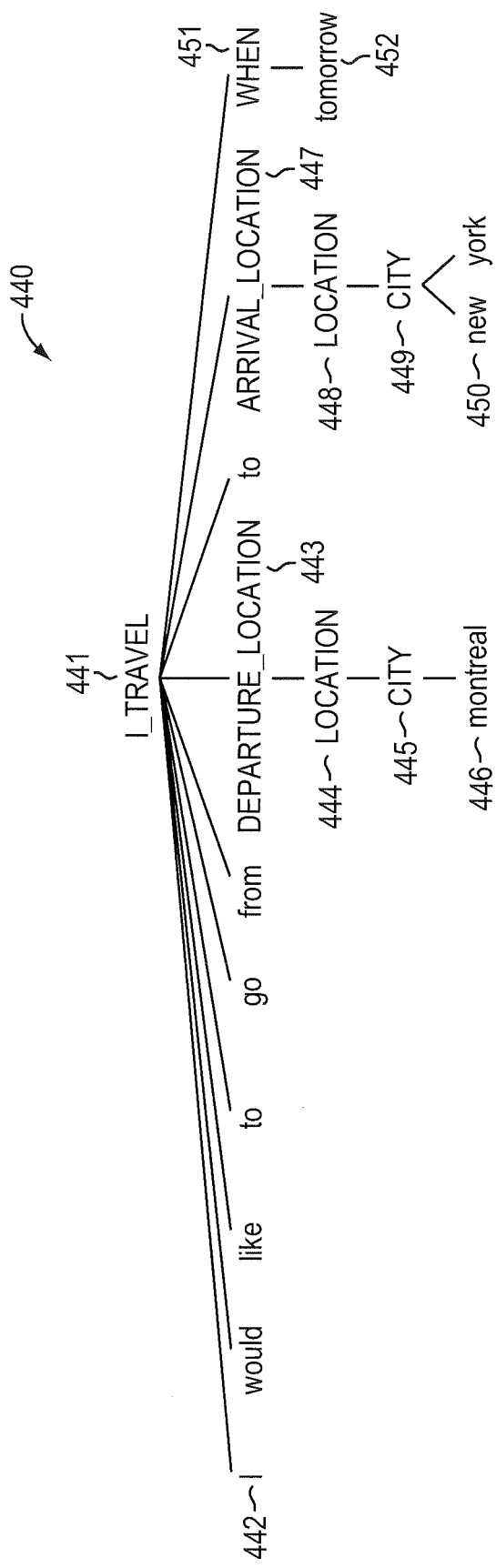
FIG. 4 is a visual depiction of an annotation tree that may be utilized in an embodiment of the present invention.

FIG. 1B illustrates a flowchart of an example method 100 for generating annotated data for use in a NLU system. The method 100 begins by parsing, by a computer device, an input annotated phrase (110). The annotated phrase may be annotated in any way as is known in the art. For example, the annotation may be in the form of an annotation tree as depicted in FIG. 4 and described hereinbelow. The annotated phrase may be obtained through any means known in the art. For example, if the method 100 is being performed by a computing device, the annotated phrase may be obtained from a local disk, a remote storage device, and/or a database. Further, in such an example, the annotated phrase may be obtained in response to a user command or may be obtained automatically, semi-automatically, or on some periodic basis. Further still, the data may be obtained from any point or combination of points communicatively coupled, via any means known in the art, to a computing device executing the method 100.

Figure 2:
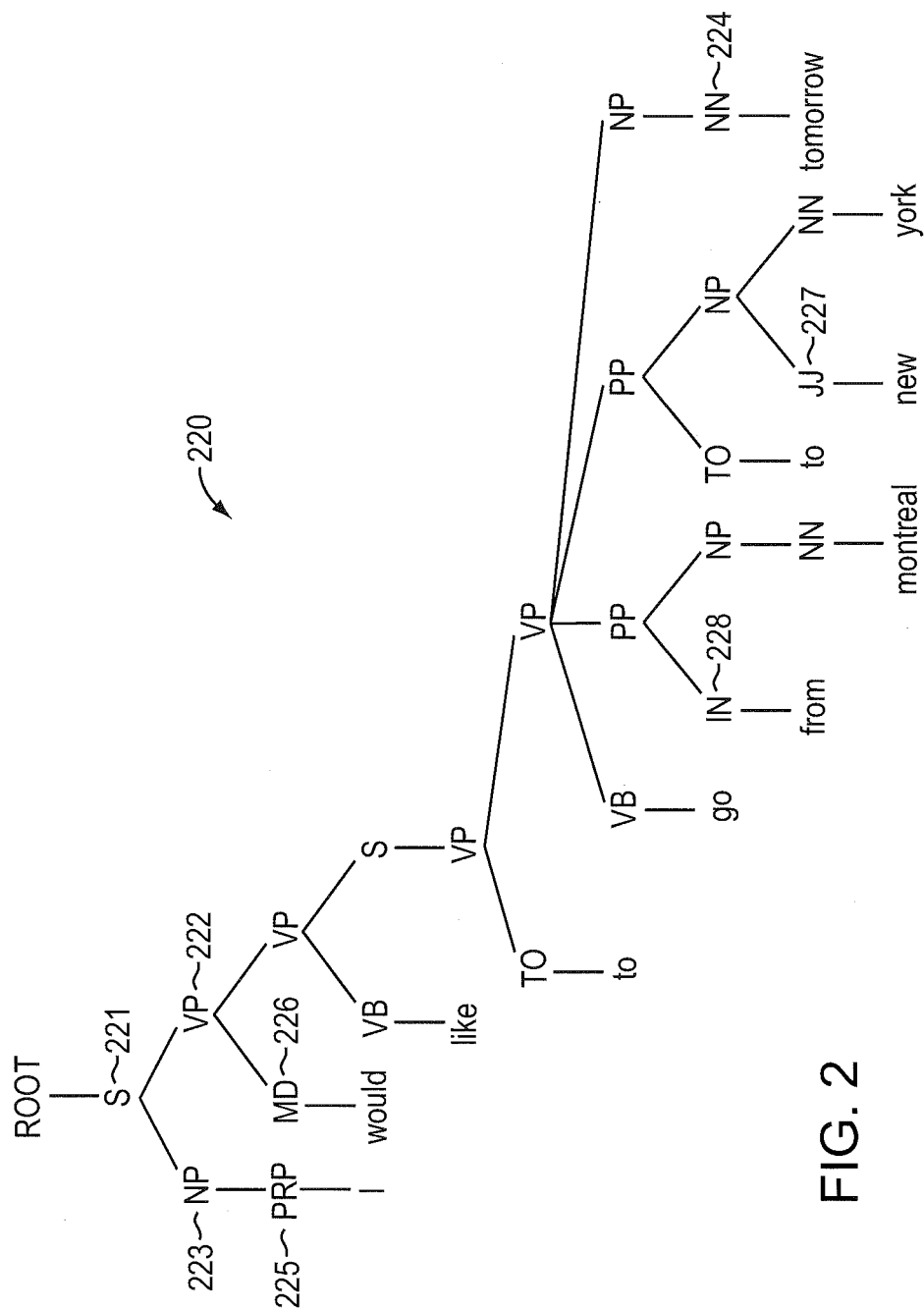
FIG. 2 depicts a syntactic tree that may be generated in performing an embodiment of the present invention.

After parsing the input annotated phrase (110), next, a syntactic tree is generated that reflects the grammatical structure of the parsed phrase (111). The generated syntactic tree may be as shown in FIG. 2. Further, the syntactic tree may be generated (111) using a parser, such as the syntactic parser 16. The parser can be internal, external, or even remotely located in relation to a tool executing the method 100.

The final operation of the example method 100 is to generate one or more alternative versions of the input annotated phrase based on the generated syntactic tree (112). When generating the alternative versions (112), alignment between expressions and corresponding annotations in the input annotated phrase are preserved in the one or more alternative versions that are generated. In such a way, an expression and its associated annotation are maintained in the newly generated input annotated phrases. For example, if the expression "Boston" is annotated as "DEPARTURE" in the original sentence, the expression "Boston" will keep the annotation "DEPARTURE" in the alternative version of the original sentence that is generated. According to an embodiment, generated alternative phrases may be added to a database or other storage device that is accessible to a NLU system for training.

According to an embodiment of the method 100, the one or more alternative versions of the input annotated phrases are generated (112) by first modifying the syntactic tree generated at block 111 to generate an alternative sentence. The same modification is then applied to the annotation of the original sentence to generate the annotation of the alternative sentence.

The method 100 may further comprise generating grammar rules, such as the grammar rules illustrated in FIG. 5, for the annotated phrase, and/or alternative versions of the annotated phrase that are generated. These grammar rules may be generated using an annotation tree associated with the phrase and a NLU system that comprises a collection of processes that, compared to manually building NLU systems, greatly speeds up building NLU systems and also produces a more accurate NLU system by exploiting various statistical inferences, automatic quality checks, and automatic generation of NLU grammars and statistical engines. Such a collection of processes may be referred to herein as a QuickNLU™. Generating such grammar rules may be done as described in U.S. patent application Ser. No. 13/941,783, the contents of which are herein incorporated by reference.

In an alternative embodiment, an alternative phrase generated at block 112 of the method 100 may be used in the method 100 to generate additional alternative phrases. In such an embodiment, the generated alternative phrase is provided, as feedback, to a computing device executing the method 100 and additional phrases are generated using said alternative phrase.

An embodiment of the method 100 further comprises validating the one or more versions of the input annotated phrase. According to such an embodiment of the method 100, validating the one or more versions comprises checking an alternative version of the one or more versions against non-annotated phrases and considering the alternative version validated upon finding a match in the database of non-annotated phrases. In such an embodiment, the non-annotated phrases may be stored on a database or any other storage device known in the art. Thus, a generated alternative phrase is considered valid if such a phrase is found in the database. Such an embodiment may further comprise adding one or more validated phrases to a database or other storage device that can be accessed or provided to a NLU system for training. Further, while the term "database" is used herein, embodiments of the present invention may store data, such as the generated annotated phrases, in any format on any device known in the art.

In an alternative embodiment of the method 100, validating the one or more alternative versions of the input annotated phrase comprises displaying the one or more versions of the input annotated phrase to a user for manual validation. In such an embodiment, the phrase may be displayed to a user via any means known in the art. For example, the one or more versions may be presented to a user in a graphical user interface (GUI) on a display device that is communicatively coupled to a computing device that is executing the method 100. In such an embodiment, the generated phrases may be displayed via a display device that is located remotely or locally in relation to said computing device.

According to an embodiment of the method 100, generating the one or more alternative versions of the input annotated phrase (112) includes applying one or more transformation rules to nodes of the syntactic tree generated at block 111 of the method 100. In an example embodiment, applying one or more transformation rules may comprise reordering expressions of the input annotated phrase within an alternative version of the one or more versions. In such an embodiment, the expressions are associated with nodes of the syntactic tree. Reordering expressions may comprise swapping one or more expressions with another expression to generate the alternative version of the input annotated phrase. In yet another embodiment, applying one or more transformation rules to nodes of the syntactic tree to generate the one or more alternative versions of the input annotated phrase includes omitting an expression of the input annotated phrase. In such an embodiment, the expressions are associated with a node of the syntactic tree that was generated at block 111 of the method 100. In a further embodiment of the method 100, the one or more transformation rules may include a rule that is associated with a language structure. In such an embodiment, the language structure rules may be any rules associated with the language as are known in the art. In yet another embodiment of the method 100 that comprises applying transformation rules to nodes of the syntactic tree, applying one or more transformation rules comprises inserting an expression within a version of the one or more versions that are generated. In such an embodiment, the inserted expressions may come from a database and/or local storage device that is communicatively coupled to a computing device executing the method 100. For example, an insertion transformation rule may add an adverb, adjective, or conjunctive phrase ("and" and "or"). The insertion rule may be used if there is a certain pattern in the syntactic tree. While numerous transformation rules have been described herein, these rules are merely examples, and transformation rules can be quite arbitrary and do not necessarily only include insertion, deletion, or swapping. Transformation rules may be based on any pattern in a syntactic tree. Further, the transformation rules may be "rewriting rules" and may pertain to more complex examples, such as "right node raising." For example, the sentence, "I want to go to Montreal" may be transformed into "I want to but she doesn't want to go to Montreal."

In another embodiment of the method 100, the one or more transformation rules comprise(s) a transformation rule learned based on a database of annotated phrases. In other words, a transformation rule is learned from analyzing other annotated phrases. According to such an embodiment, the method 100 may include determining one or more transformation rules based upon annotated phrases that are stored on a database or any other storage device.

According to an embodiment, the input annotated phrase (110) may be obtained from a database of phrases, i.e., a corpus. In another embodiment, the one or more generated alternative phrases may be added to a corpus. According to such an embodiment, a generated alternative phrase may not be added to the corpus until the sentence is validated. A further embodiment of the method 100 may comprise training a NLU engine using the generated alternative version of the input annotated phrase.

FIG. 2 illustrates a syntactic tree 220 that may be generated according to an embodiment of the present invention. The syntactic tree 220 is generated using the example sentence "I would like to go from Montréal to New York tomorrow." The syntactic tree 220 illustrates the aforementioned sentence broken down into its various parts of speech and the relationship between these various components. The syntactic tree 220 shows that from the root 221 the sentence "I would like to go from Montréal to New York tomorrow" is composed of the noun phrase (NP) 223 and the verb phrase (VP) 222. The noun phrase 223 is further broken down to contain the personal pronoun (PRP) 225. The verb phrase 222 is then broken into the modal verb (MD) 226 and the additional verb phrases as shown in FIG. 2. The sentence and its various components are further broken down into their constituent parts to form the syntactic tree 220. As shown in FIG. 2, the portions, IN (preposition or subordinating conjunction) 228, JJ (adjective) 227, and NN (singular noun) 224 further illustrate various constituent parts of the sentence that form the syntactic tree 220. Other various constituent parts of a syntactic tree may include a VB (base form verb), PP (prepositional phrase), or TO (to Just to), amongst others.

As described hereinabove, the method 100 comprises parsing an input annotated phrase (110). FIG. 2 illustrates components of a sentence that may be determined when parsing (110) the sentence "I would like to go from Montréal to New York tomorrow." The method 100 further comprises generating a syntactic tree reflecting a grammatical structure of the parsed phrase (111). The syntactic tree 220 is an example of a syntactic tree that illustrates the grammatical structure of a sentence, in this case, "I would like to go from Montréal to New York tomorrow," that may be generated at block 111 of the method 100.

A syntactic parsing and associated syntactic tree can be used to generate alternatives of a sentence. Embodiments of the present invention can use defined lists of modifications, e.g., permutations or removals, on a generated syntactic tree to generate alternatives of a sentence. For example, an embodiment may swap a prepositional phrase and a noun phrase when they are alone on a branch within a potential starting verb phrase. In another example embodiment, a prepositional phrase or noun phrase may be erased (omitted). For example, the aforementioned rules may be used on the sentence of the syntactic tree 220 to generate the following alternative sentences: "I would like to go tomorrow from Montréal to New York," "I would like to go tomorrow to New York from Montréal," "I would like to go to New York from Montréal tomorrow," "I would like to go tomorrow from Montréal," "I would like to go tomorrow to New York," "I would like to go tomorrow to New York from Montréal," "I would like to go to New York tomorrow," "I would like to go to New York," "I would like to go tomorrow," amongst others. In this manner, multiple new sentences can be generated by applying modifications to a syntactic tree.

Figure 3:
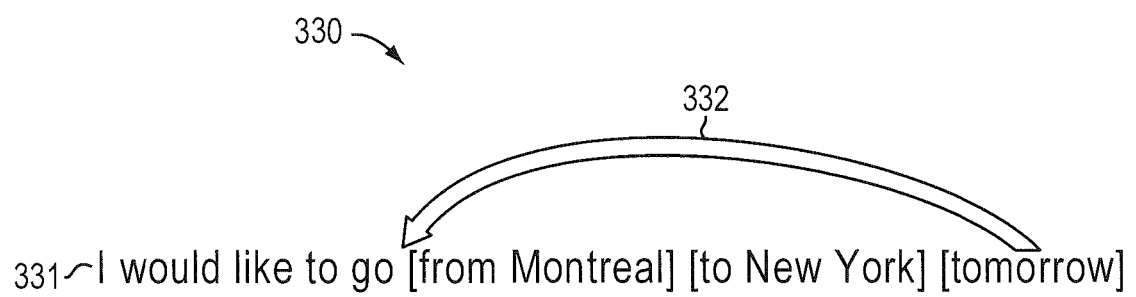
FIG. 3 illustrates an alternative phrase generated using a swap that may be determined according to an example embodiment.

Further, embodiments of the present invention may trace the modifications, e.g., swaps and removals, that were done on the initial sentence to generate the alternative sentence. For example, the alternative sentence, "I would like to go tomorrow from Montréal to New York," may be represented by the form shown in FIG. 3. FIG. 3 illustrates the alternative sentence 330 generated using the original sentence 331. The alternative sentence 330 is depicted as the original sentence 331 with the swap 332. The swap 332 illustrates that the original sentence 331 is transformed into the alternative sentence 330 "I would like to go tomorrow from New York to Montréal." Thus, embodiments of the present invention generate alternative sentences and may track the modifications used to generate said alternative sentences. These alternative sentences and corresponding modifications may be stored using any means known in the art, for example, such information may be stored in the memory of a computing device executing an embodiment of the present invention.

Embodiments of the present invention utilize an annotated sentence to generate one or more alternative annotated sentences. FIG. 4 illustrates an example of an annotated sentence, annotated in the form of an annotation tree 440. FIG. 4 illustrates the annotation tree 440 of the sentence "I would like to go from Montréal to New York tomorrow" 442. The annotation tree 440 illustrates that the category I_TRAVEL 441 comprises the sentence 442. The sentence 442 is further annotated with the DEPARTURE_LOCATION annotation 443, ARRIVAL_LOCATION annotation 447, and WHEN annotation 451. The annotation tree 440 further breaks down the DEPARTURE_LOCATION annotation 443 into the LOCATION annotation 444 and CITY annotation 445, and indicates that the DEPARTURE_LOCATION, LOCATION, and CITY annotations apply to the expression Montréal 446 in the sentence 442. The ARRIVAL_LOCATION annotation 447 is similarly broken down in the annotation tree 440 to include the LOCATION annotation 448 and CITY annotation 449, which are all annotations of the expression New York 450 in the sentence 442. The annotation tree 440 further indicates that the term "tomorrow" 452 has the corresponding annotation WHEN 451.

An ontology may be used to generate alternative sentences. For example, an ontology may provide information on what is a date expression, e.g., WHEN. The information may then be used to generate an alternative sentence so the alternative sentence does not have to include the word "tomorrow," and may instead use any date expression from the ontology.

FIG. 5 illustrates grammar rules 555 that can be generated according to principles known in the art, such as those described in U.S. patent application Ser. No. 13/941,783, using the annotation tree 440. For example, the grammar rules 555 may be generated using the QuickNLU™ as described hereinabove.

Figure 6:
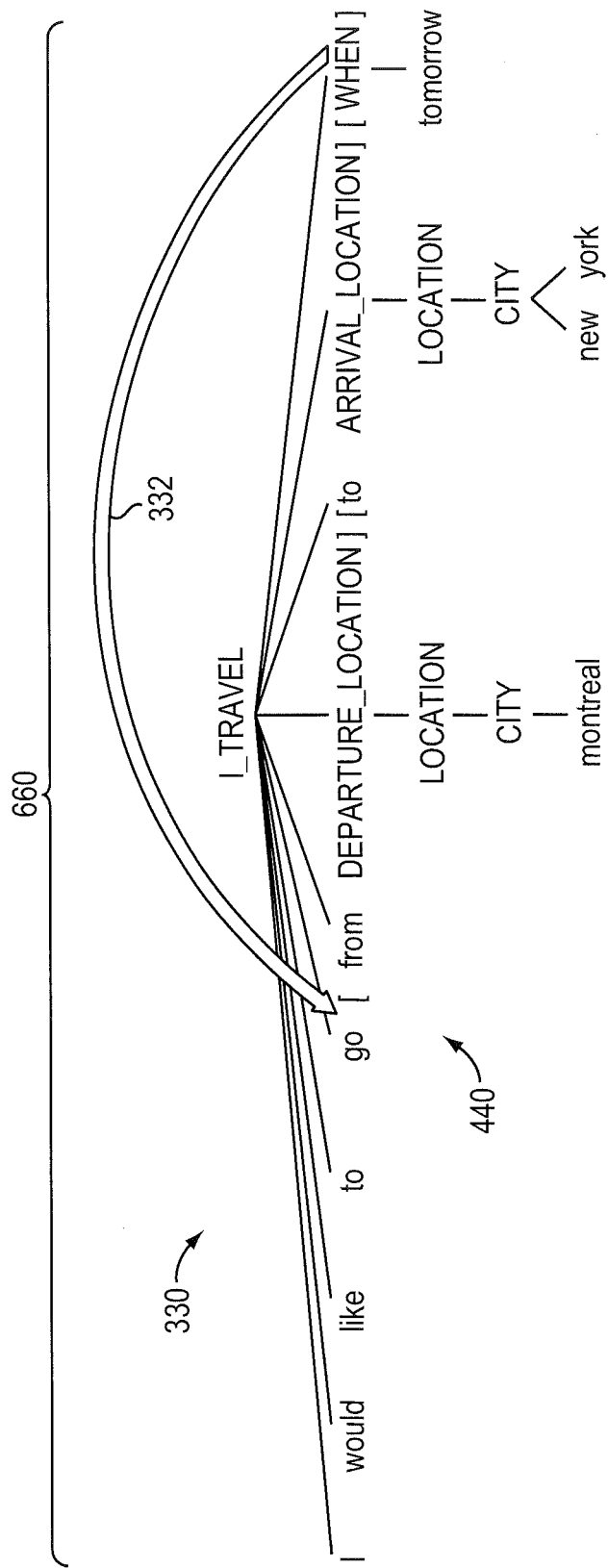
FIG. 6 is a visual depiction of an annotated phrase generated according to an embodiment of the present invention.

The process for generating alternative sentences of an input annotated phrase, according to several embodiments of the present invention, is described hereinabove. However, these alternative sentences, generated by making modifications to the syntactic tree, need corresponding annotations. FIG. 6 illustrates the annotated sentence 660 generated according to principles of the present invention. The annotation is developed by laying the alternative sentence 330 on top of the annotation tree 440, thereby performing the same modification, e.g. swap 332, to the annotation tree 440 that was used to generate the alternative sentence 330, thus generating the annotated sentence 660. This process may be performed at block 112 of the method 100.

From the initial sentence annotation, embodiments of the present invention generate the annotation of the new sentences and, thus, can generate the semantic grammar rules of example alternative sentences. Embodiments of the present invention may employ a process to determine if there are permutations within the annotated mentions that preserve the inner mention order, but comply to the edition of the alternative sentence. For example, the alternative sentence 330 laying on top of the annotation of the permutation of the alternative 440, does not break any annotation sub-tree and is, therefore, an accepted edit. Thus, the new annotation is given by the permutation shown in FIG. 6.

Methods used in embodiments of the present invention can be generalized when swap shall invoke swap at multi-level (but not across level swaps). Such an example is described herein below in relation to FIGS. 7A-D. While a relatively simple example is described herein, i.e. the swap of the expression "tomorrow," this example yields many non-trivial alternatives and the door is open to use the semantic annotation with, in the background, the power of an ontology and a syntactic parser.

An alternative embodiment may also generate one grammar rule from all alternatives using the semantic rule, such as grxml, syntax, as shown in FIG. 5, such as <one-of>, etc. This may yield more condensed and powerful grammars. Further still, embodiments of this invention may be performed on the fly, i.e., during run time, or may utilize pre- and/or post-processing. The example annotated alternative sentences described herein may be utilized to train NLU systems; however, embodiments of the present invention are not so limited and may be used train other engines, e.g., a statistical engine. Embodiments of the present invention may be used to help training models that generalize better, especially at low levels of training. For example, embodiments of the present invention may be used to train a statistical classifier that identifies the intention of a speaker of a sentence. Additional data created in this way likely results in a better classifier.

As described herein, embodiments of the present invention may utilize various transformation rules. These transformation rules may be used to modify the syntactic tree that is generated at block 111 of the method 100. For example, various rules may include permutation of the verb phrase, prepositional phrase, and noun phrase siblings in the syntactic tree. Further transformation rules may include removal of one or more verb phrases, prepositional phrases, and noun phrases in the syntactic parse tree. Further still, embodiments of the present invention may allow permutations and removals of syntax sub-trees that correspond to top-level mentions only in the annotation tree. Such transformation rules may allow for a significant increase in performance when using the NLU engine assisted by the syntactic parser. Since the strength of the syntactic NLU engine is to add alternatives for sentences in the training set, one can expect both current and syntax-assisted engines to converge as the training set grows larger. However, the syntax-assisted engine risks over-generating invalid syntactic alternatives by removing a piece of a sentence that is essential to convey the original intent thereof. One potential method for overcoming such a problem is described hereinbelow in reference to FIGS. 8A-C.

Figure 7A:
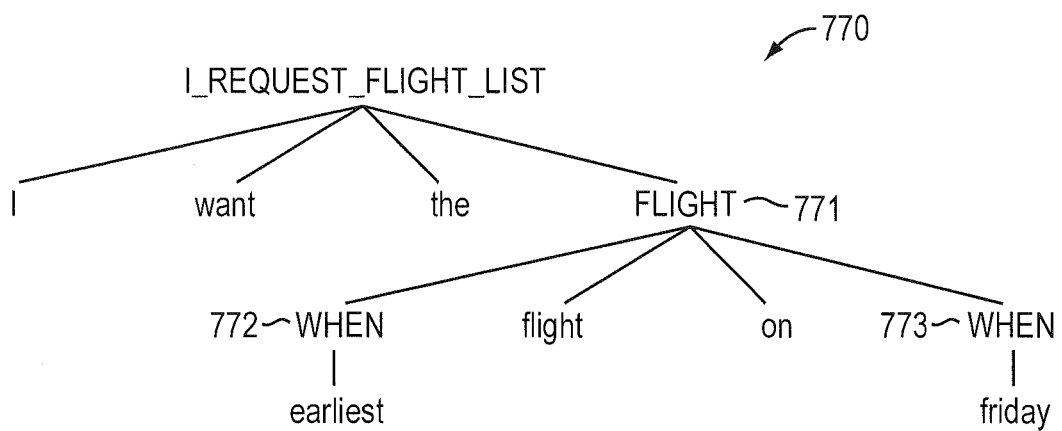
FIG. 7A depicts an example annotated sentence that may be utilized in an embodiment of the present invention.
Figure 7B:
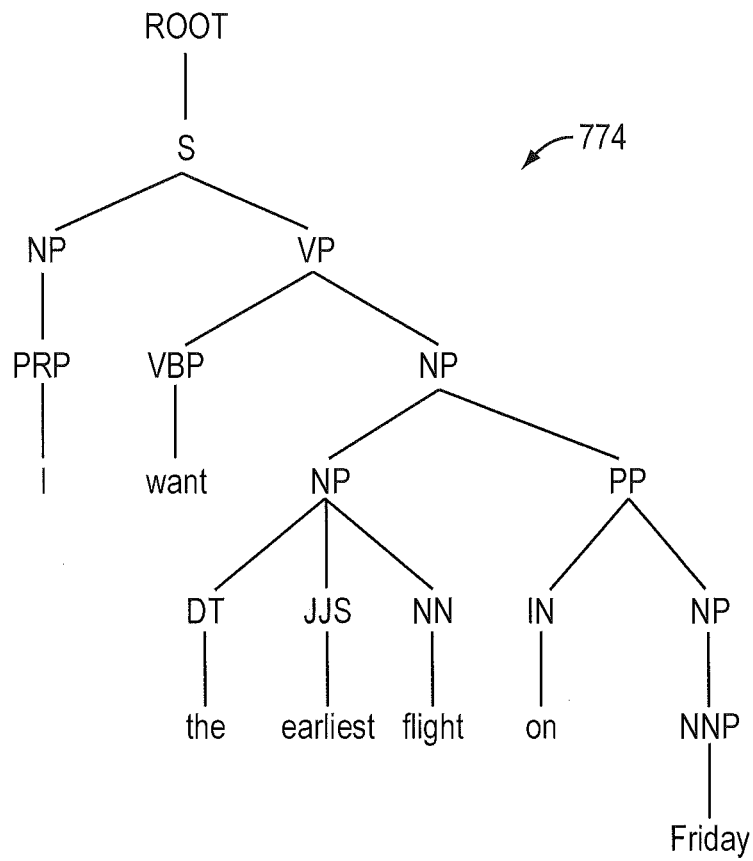
FIG. 7B is syntactic tree generated in carrying out an example embodiment.
Figures 7C, 7D:
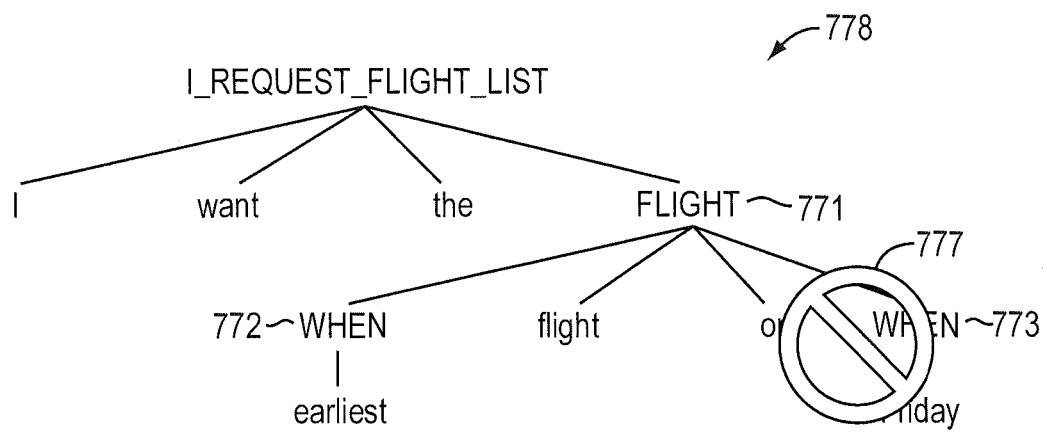
FIG. 7C is an example of an alternative sentence generated according to at least one embodiment.
FIG. 7D is a visual depiction of laying the generated alternative sentence of FIG. 7C on the semantic annotation of FIG. 7A.

The previous example described hereinabove showed an example of a top-level swap in an annotation tree. However, embodiments of the present invention can extend this process to lower levels of the annotation tree. FIGS. 7A-D illustrate the process of generating an alternative annotated sentence by employing a lower-level swap in the annotation tree. The example sentence used with reference to FIGS. 7A-D is "I want the earliest flight on Friday." FIG. 7A illustrates an annotated sentence 770 with the top-level mention 771 and two lower level mentions 772 and 773. According to embodiments using the principles of the present invention, the annotated sentence is then parsed, and a syntactic tree 774 is generated, as shown in FIG. 7B. FIG. 7C illustrates an alternative sentence 775 wherein the prepositional phrase "on Friday" 776 is removed 777, yielding the alternative sentence "I want the earliest flight." FIG. 7D illustrates the generated annotated phrase 778 for the alternative sentence 775. The annotated alternative sentence 778 is obtained by mapping the modification 777 of the syntactic tree onto the original annotation tree. In this example, the upper level mention 771 and the first lower-level mention 772 are maintained while the second lower-level mention 773 is removed 777, thus generating a valid annotation 778 of the sentence "I want the earliest flight." This process can be repeated for other syntactic swaps or removals to generate other alternative sentences.

FIGS. 8A-C illustrate example risks of overgeneralizing a sentence by removing a key part of a sentence that conveys an intent. The example sentence used in FIGS. 8A-C is "show me my checks." The sentence has an annotation tree 880 shown in FIG. 8A, which has the intent "INTENTION_REQUEST_CHECK 881. According to an embodiment according principles of the present invention, the sentence is then parsed, and the syntactic tree 882, with the clause with subject-verb inversion (SINV) comprising the verb phrase 883 and noun phrase 884, is generated. FIG. 8C shows an alternative sentence 885 with the noun phrase 884 removed 886. However, the resulting alternative sentence 885, "show me," has lost the original intent of INTENTION_REQUEST_CHECK 881 and is not a valid alternative. One way to prevent generation of this invalid alternative is to remove only syntactic subtrees that contain mentions in the annotation tree. One can assume that any word outside of the mentions is associated with the intent and only allow removal of the syntactic subtree if the annotation tree contains one or more mentions. Since there are no mentions in this example, then neither the verb phrase nor noun phrase subtrees can be removed to generate alternative sentences, and the false alternative would not be generated.

Figure 9:
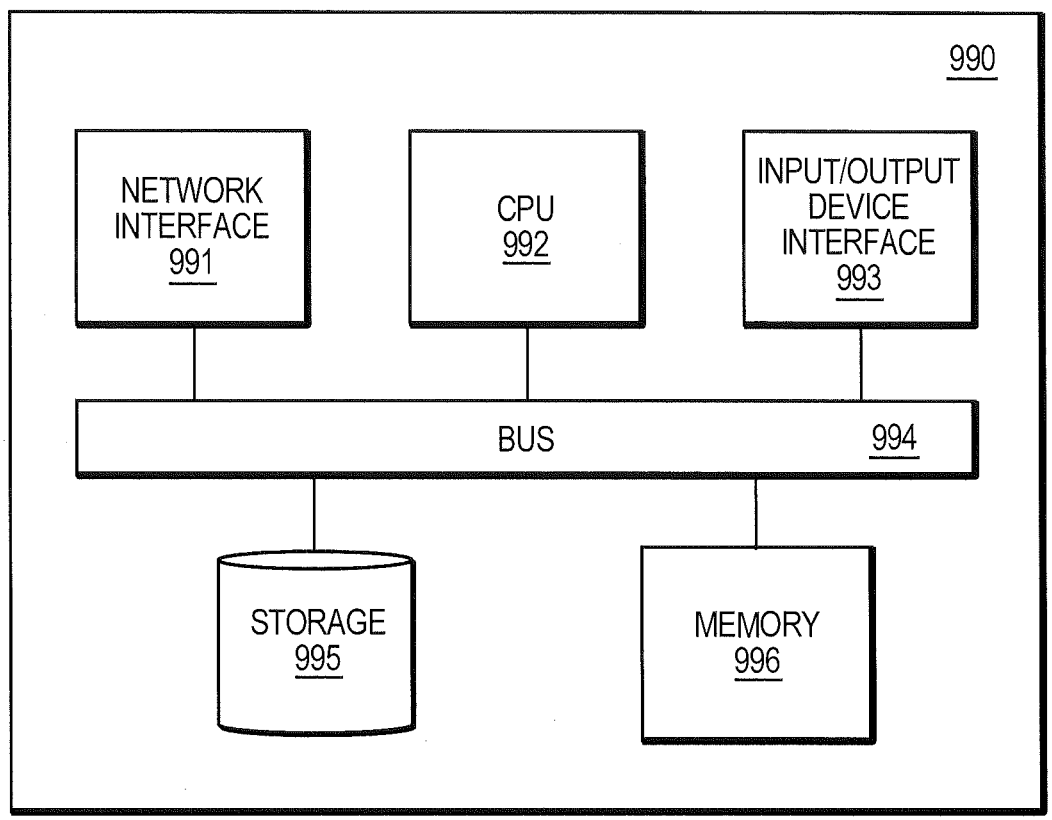
FIG. 9 is a simplified block diagram of a computer system in which the present invention may be embodied.

FIG. 9 is a simplified block diagram of a computer-based system 990 that may be used to generate annotated data for use in a NLU system according to an embodiment according to the principles of the present invention. The system 990 comprises a bus 994. The bus 994 serves as an interconnect between the various components of the system 990. Connected to the bus 994 is an input/output device interface 993 for connecting various input and output devices such as a keyboard, mouse, display, speakers, etc. to the system 990. A central processing unit (CPU) 992 is connected to the bus 994 and provides for the execution of computer instructions. Memory 996 provides volatile storage for data used for carrying out computer instructions. Storage 995 provides non-volatile storage for software instructions, such as an operating system (not shown). The system 990 also comprises a network interface 991 for connecting to any variety of networks known in the art, including wide area networks (WANs) and local area networks (LANs).

It should be understood that the example embodiments described herein may be implemented in many different ways. In some instances, the various methods and machines described herein may each be implemented by a physical, virtual, or hybrid general purpose computer, such as the computer system 990. The computer system 990 may be transformed into the machines that execute the methods described herein, for example, by loading software instructions into either memory 996 or non-volatile storage 995 for execution by the CPU 992.

The system 990 and its various components may be configured to carry out any embodiments of the present invention described herein. For example, the system 990 may be configured to carry out the method 100 described hereinabove in relation to FIG. 1B. In such an example, the CPU 992 and the memory 996 with computer code instructions stored on the memory 996 and/or storage device 995 configure the apparatus 990 to parse an input annotated phrase, generate a syntactic tree reflecting the grammatical structure of the parsed phrase, and generate one or more alternative versions of the input annotated phrase based on the generated syntactic tree in a manner preserving alignment between expressions and corresponding annotations in the input annotated phrase in the one or more alternative versions that are generated. In such an embodiment, the original annotated phrase may be obtained by the system 990 via the network interface 991 and/or input/output device interface 993, from any point communicatively coupled thereto. Further, the original phrase may be loaded from the storage device 995 or memory 996.

FIG. 10 illustrates a computer network environment 1000 in which the present invention may be implemented. In the computer network environment 1000, the server 1001 is linked through communications network 1002 to clients 1003a-n. The environment 1000 may be used to allow the clients 1003a-n alone or in combination with the server 1001 to execute the various methods described hereinabove. In an example embodiment, the client 1003a sends an annotated phrase, shown by the data packets 1005, via the network 1002 to the server 1001. In response, the server 1001 uses the annotated phrase 1005 to generate alternative annotated phrases, which may then be transferred back to the client 1003a, shown by the data packets 1004, via the network 1002. In another embodiment, a method according to the principles described herein is executed on the server 1001 and accessed by the clients 1003a-n via the network 1002.

It should be understood that the example embodiments described above may be implemented in many different ways. In some instances, the various methods and machines described herein may each be implemented by a physical, virtual, or hybrid general purpose computer, or a computer network environment such as the computer environment 1000.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should also be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this invention has been particularly shown and described with references to example embodiments thereof, it will be understood by those skilled in the art that various changes in form and details may be made therein without departing from the scope of the invention encompassed by the appended claims.

What is claimed is:

1. A method of generating annotated data for use in a natural language understanding (NLU) system, the method comprising:
    parsing, by a computer device, an input annotated phrase having semantic labels;
    generating a syntactic tree reflecting a grammatical structure of the phrase parsed;
    generating one or more annotated alternative versions of the input annotated phrase based on the generated syntactic tree in a manner preserving alignment between expressions and corresponding semantic labels in the input annotated phrase in the one or more annotated alternative versions generated; and
    training a NLU system with the generated one or more annotated alternative versions of the input annotated phrase.

2. The method as recited in claim 1 further comprising validating the one or more annotated alternative versions of the input annotated phrase.

3. The method as recited in claim 2, wherein validating the one or more annotated alternative versions of the input annotated phrase includes:
    checking a non-annotated portion of an alternative version, of the one or more annotated alternative versions, against a database of non-annotated phrases; and
    validating the alternative version upon a match between the non-annotated portion of the alternative version and a non-annotated phrase in the database.

4. The method as recited in claim 2, wherein validating the one or more annotated alternative versions of the input annotated phrase includes displaying the one or more annotated alternative versions of the input annotated phrase to a user for manual validation.

5. The method as recited in claim 1, wherein generating the one or more annotated alternative versions of the input annotated phrase includes applying one or more transformation rules to nodes of the syntactic tree.

6. The method as recited in claim 5, wherein applying one or more transformation rules to nodes of the syntactic tree includes reordering expressions of the input annotated phrase within an alternative version of the one or more annotated alternative versions generated, the expressions associated with nodes of the syntactic tree generated.

7. The method as recited in claim 5, wherein applying one or more transformation rules to nodes of the syntactic tree includes omitting an expression of the input annotated phrase within an alternative version of the one or more versions generated, the expression associated with a node of the syntactic tree generated.

8. The method as recited in claim 7, wherein the one or more transformation rules include a rule associated with a language structure.

9. The method as recited in claim 5, wherein applying one or more transformation rules to nodes of the syntactic tree includes inserting an expression within a version of the one or more versions generated.

10. The method as recited in claim 5, wherein the one or more transformation rules include a transformation rule learned based on a database of annotated phrases.

11. The method as recited in claim 5, wherein the one or more transformation rules include a rule associated with a language structure.

12. An apparatus for generating annotated data for use in a natural language understanding (NLU) system, the apparatus comprising:
a processor; and
a memory with computer code instructions stored thereon, the processor and the memory, with the computer code instructions, being configured to cause the apparatus to:
parse an input annotated phrase having semantic labels;
generate a syntactic tree reflecting a grammatical structure of the phrase parsed;
generate one or more annotated alternative versions of the input annotated phrase based on the generated syntactic tree in a manner preserving alignment between expressions and corresponding semantic labels in the input annotated phrase in the one or more annotated alternative versions generated; and
train a NLU system with the generated one or more annotated alternative versions of the input annotated phrase.

13. The apparatus as recited in claim 12, wherein the processor and the memory, with the computer code instructions, are further configured to cause the apparatus to validate the one or more annotated alternative versions of the input annotated phrase.

14. The apparatus as recited in claim 13, wherein validating the one or more annotated alternative versions of the input annotated phrase, the processor and the memory, with the computer code instructions, are further configured to cause the apparatus to:
check a non-annotated portion of an alternative version, of the one or more annotated alternative versions, against a database of non-annotated phrases; and
validate the alternative version upon a match between the non-annotated portion of the alternative version and a non-annotated phrase in the database.

15. The apparatus as recited in claim 13, wherein validating the one or more annotated alternative versions of the input annotated phrase, the processor and the memory, with the computer code instructions, are further configured to cause the apparatus to display the one or more versions of the input annotated phrase to a user for manual validation.

16. The apparatus as recited in claim 12, wherein generating the one or more annotated alternative versions of the input annotated phrase, the processor and the memory, with the computer code instructions, are further configured to cause the apparatus to apply one or more transformation rules to nodes of the syntactic tree.

17. The apparatus as recited in claim 16, wherein applying one or more transformation rules to nodes of the syntactic tree, the processor and the memory, with the computer code instructions, are further configured to cause the apparatus to reorder expressions of the input annotated phrase within an alternative version of the one or more versions generated, the expression associated with nodes of the syntactic tree generated.

18. The apparatus as recited in claim 16, wherein applying one or more transformation rules to nodes of the syntactic tree, the processor and the memory, with the computer code instructions, are further configured to cause the apparatus to omit an expression of the input annotated phrase within an alternative version of the one or more annotated alternative versions generated, the expression associated with a node of the syntactic tree generated.

19. The apparatus as recited in claim 16, wherein applying one or more transformation rules to nodes of the syntactic tree, the processor and the memory, with the computer code instructions, are further configured to cause the apparatus to insert an expression within a version of the one or more versions generated.

20. A computer program product executed by a server in communication across a network with one or more clients, the computer program product comprising:
a non-transitory computer readable medium, the computer readable medium comprising program instructions which, when executed by a processor causes:
parsing an input annotated phrase having semantic labels;
generating a syntactic tree reflecting a grammatical structure of the phrase parsed;
generating one or more annotated alternative versions of the input annotated phrase based on the generated syntactic tree in a manner preserving alignment between expressions and corresponding semantic labels in the input annotated phrase in the one or more annotated alternative versions generated; and
training a NLU system with the generated one or more annotated alternative versions of the input annotated phrase.

* * * * *